3,332,844
PROCESS FOR RECOVERING NYSTATIN
John Vandeputte, Milltown, and Urs F. Nager, Princeton, N.J., assignors, by mesne assignment, to E. R. Squibb & Sons, Inc., New York, N.Y., a corporation of Delaware
No Drawing. Filed Dec. 16, 1963, Ser. No. 330,541
8 Claims. (Cl. 167—65)

This invention relates to a new process for recovering the antibiotic nystatin from the fermentation broth in which it is produced.

Nystatin is an antifungal antibiotic described in U.S. Patent No. 2,797,183, issued June 25, 1957, to Hazen et al. It is prepared by culturing Streptomyces noursei in a nutrient medium. Various methods have been described for extracting the nystatin from the fermentation broth in which it is formed (see U.S. Patents Nos. 2,797,183, 2,786,781, 2,832,719 and 2,865,807).

It has now been found that by employing the method of this invention, nystatin can be obtained in greater yield and purity than hitherto possible by methods known in the art. In essence, the process of this invention comprises separating the mycelium from the whole broth of a nystatin containing fermentation medium, treating the mycelium with water (unless a wet mycelium is used); a lower alkanol (preferably methanol); an acid, such as oxalic, malonic, succinic and citric acid and preferably a mineral acid, such as sulfuric acid; and an amine, such as a primary amine, such as a lower alkyl amine (e.g., methyl amine) and a lower hydroxyalkyl amine (e.g., ethanolamine), a secondary amine, such as a di(lower alkyl)amine (e.g. dimethylamine and diethylamine), a di(hydroxy lower alkyl)amine, and a (lower alkyl) (lower hydroxyalkyl)amine (e.g., methylethanolamine), and preferably a tertiary amine, such as a tri(lower alkyl)amine and, optimally, a tri(hydroxy-lower alkyl)amine, the acid and amine being in such proportions that the resulting aqueous alcoholic solution is of substantially neutral pH (i.e., has a pH in the range of about 6 to about 6.5), whereby the nystatin is dissolved in the aqueous alcoholic solution, and recovering the nystatin from said solution.

The mycelium used as the starting material in the process of this invention may be obtained by filtering the whole broth of a nystatin containing fermentation medium, such as that obtained in U.S. Patent No. 2,797,183, preferably after adding a filter aid, such as Hyflo. The filtrate is discarded and the separated wet mycelium containing the nystatin is further treated in accordance with method of this invention.

To the wet mycelium is added a lower alkanol (preferably methanol); an acid, particularly a mineral acid, such as hydrochloric acid and optimally sulfuric acid; and an amine, particularly a tertiary amine, such as a tri(lower alkyl)amine (e.g., trimethylamine and triethylamine) and, optimally, a tri(hydroxy-lower alkyl)amine (e.g., triethanolamine). The quantity of acid and amine added are so adjusted that the resulting aqueous alkanol solution has a substantially neutral pH, (i.e., a pH in the range of about 6 to about 6.5 and, optimally, about 6 to about 6.2). Although the addition of the alkanol, acid and amine may be made in any order, it has been surprisingly found that if the acid and amine are added together in the form of the acid-addition salt of the amine, so that there is no wide variation of pH of the aqueous alkanol solvent, as would occur if the acid and amine were added separately and which might cause degradation of the nystatin, the nystatin is still solubilized. Therefore, in accordance with the preferred process of this invention a solution of the mineral acid-addition salt of the tertiary amine (e.g., triethylamine sulfate and optimally triethanolamine sulfate) in aqueous lower alkanol is used as the extracting medium.

Although the amount of alkanol added is not critical, at least about 2.0 ml. of alkanol per g. of wet mycelium cake should be used to assure substantially complete extraction of the nystatin from the mycelium into the aqueous alkanol. Moreover, so as to obviate the necessity of removing large quantities of solvent after the extraction step, in the preferred process of this invention not more than about 2.5 ml. of alkanol per g. of mycelium is used.

Although the amount of amine is not critical, the preferred concentration of amine is about 0.02 ml. to about 0.05 ml. of amine per ml. of alkanol. The amount of said used is so adjusted to give the desired ultimate pH ranges mentioned hereinbefore. The amount of water is also not critical; however, it is preferable that no more than about 0.25 ml. of water per ml. of alkanol be present during the extraction step.

The alkanol, amine and acid are then added to the mycelium to dissolve the nystatin. After solution of the nystatin is complete, with the aid of agitation if necessary, the spent mycelium is filtered or centrifuged off and discarded. To assure that all nystatin has been removed from the mycelium, the mycelium may be washed with additional alkanol.

To recover the nystatin, the filtrate (and combined wash, if any) is concentrated in water and a water-miscible ketone, such as acetone, are added. The resulting mixture is then heated to a temperature of about 45° C. to about 5° C. (optimally about 50° C. to about 52° C.) and cooled, whereupon substantially pure nystatin crystallizes from solution and is recovered.

The following examples illustrate the process of this invention( all temperatures being in centigrade):

*Example 1*

(a) *Separation of the mycelium.*—To the nystatin whole broth resulting from the fermentation of Streptomyces noursei in an aqueous soy meal molasses nutrient medium is added 4% w./v. of Hyflo. The resulting mixture is filtered and the mycelium is recovered.

(b) *Extraction of the nystatin from the mycelium.*—The mycelium obtained in step (a) is slurried in about 10 volumes of methanol, adjusted to pH 3 with sulfuric acid, agitated for seven minutes, neutralized with triethylamine, and filtered. The filtrate is concentrated to about one-twentieth of its original volume and the resulting slurry is crystallized at 45° after dilution with an equal volume of 40% aqueous acetone. The precipitate is collected on a solid bowl centrifuge, reslurried in 40% aqueous acetone, recentrifuged, reslurried in acetone, recentrifuged, and dried. The nystatin obtained has a potency of about 4,000 units per mg., is more thermostable than nystatin recovered by previous methods and has an ash content of less than 1%.

*Example 2*

A methanol solution is prepared by adding 2% (v./v.) of triethylamnie to methanol and then adding 40% aqueous sulfuric acid to reduce the pH to 6. The mycelium obtained in step (a) of Example 1 is then added to the methanol-triethylamine sulfate solution so that the final methanol concentration is approximately 90%. The mixture is then agitated vigorously for one-half hour, the pH adjusted to 6.8 with triethylamine and filtered. The filter cake is washed with 90% aqueous methanol (10% of extraction volume) and is then discarded.

The filtrate and wash are mixed and concentrated to about one-twentieth of their original volume. This removes essentially all the methanol. To the concentrate is added two volumes of 60% aqueous acetone. The mixture is adjusted to pH 6.5 by addition to triethylamine or sulfuric acid, as needed, heated to 50–52° for one hour, cooled to room temperature over a period of one to one and one-half hours, and then held at room temperature for five to six hours.

The crystalline produce is then filtered off, reslurried with 5 ml. of 40% aqueous acetone per wet gram of product, then with 10 ml. of acetone per wet gram of product and is dried under vacuum in the usual manner. Crystalline nystatin is obtained in yields of 75–90% (based on the activity originally present in the mycelium), assaying about 4,500 units per mg. and being stable at 100° for about 48 hours.

*Example 3*

A methanol solution is prepared by adding 4% (v./v.) of triethanolamine to methanol and then adding 40% aqueous sulfuric acid to reduce to pH to about 6. The mycelium obtained in step (a) of Example 1 is then added to the methanol-triethanolamine sulfate solution so that the final methanol concentration is approximately 80% (v./v.). The mixture is then agitated vigorously for one-half hour and filtered. The filter cake is washed with 85% aqueous methanol (20% of the volume of methanol used for extraction) and is then discarded.

The filtrate and wash are mixed and concentrated to one-tenth their original volume. To the concentrate is added three volumes of 60% aqueous acetone, the pH is adjusted to 6.5 (with sulfuric acid or triethanolamine, as needed), the mixture is heated to 50–52° for one hour, cooled to room temperature over a period of one to one and one-half hours and stirred at room temperature for five to six hours. The crystalline product is filtered off, reslurried with 6 ml. of 40% aqueous acetone per wet gram of product, then with 10 ml. of acetone per wet gram of product and is dried under vacuum in the usual manner. Crystalline nystatin is obtained in yields of 90–100% (based on the activity originally present in the mycelium), assaying about 5,000 units per mg. and being stabile at 100° for at least 48 hours.

*Example 4*

The methanol solution is prepared by adding 2.5% (v./v.) triethylamine to methanol and then adding solid citric acid to reduce the pH to 6. The rich mycelia cake obtained in step (a) Example 1, is added to the methanol-triethylamine citrate solution so that the final methanol concentration is approximately 90%. The mixture is agitated vigorously for ½ hour, the pH then adjusted to 6.8 with triethylamine and filtered. The filter cake is washed with 90% aqueous methanol (10% of extraction volume) and is discarded.

The filtrate and wash is concentrated to one-twentieth the original volume to remove the methanol. To the concentrate is added two volumes of 60% aqueous acetone, the pH adjusted to 6.5 with triethylamine or citric acid as needed, heated to 50–52° for 1 hour, cooled to room temperature over a period of 1 to 1½ hours, then held at room temperature for 5 to 6 hours.

The crystalline product is then filtered off, reslurried in 40% aqueous acetone at a concentration of 5 ml./wet g. of product, filtered, the separated product slurred in acetone at a concentration of 10 ml./wet g., filtered and the product dried under vacuum in the usual manner.

Product yields amount to 70–85% (based on the activity originally present in the mycelium). The product bioassays in the 3800–4500 $\mu$/mg. range and has good stability at 100°.

The performance of other organic acid-amine salt combinations on solubilization of nystatin in methanol is similar to that described in Example 4.

The invention may be variously otherwise embodied within the scope of the appended claims.

What is claimed is:

1. A process for recovering nystatin from the mycelium of the whole broth in which the nystatin was formed which comprises treating said mycelium with an aqueous lower alkanol, an acid, and an amine selected from the group consisting of lower alkyl amine, hydroxy lower alkyl amine, di(lower alkyl)amine, di(hydroxy lower alkyl)amine, (lower alkyl)-(hydroxy lower alkyl)amine, tri(lower alkyl)amine, tri(hydroxy lower alkyl)amine, the acid and amine being in such proportions that the resulting aqueous alcoholic solution is of substantially neutral pH, and recovering the nystatin from said solution.

2. The process of claim 1 wherein the acid is a mineral acid and the amine is a tertiary amine.

3. The process of claim 2 wherein the alkanol is methanol.

4. A process for recovering nystatin from the mycelium of the whole broth in which the nystatin was produced which comprises treating said mycelium with aqueous methanol and the sulfate salt of a tertiary amine selected from the group consisting of tri(lower alkyl)amine and tri(hydroxy lower alkyl)amine, whereby the nystatin is extracted into the aqueous methanolic solution, and recovering the nystatin from said solution.

5. The process of claim 4, wherein the tertiary amine is tri(lower alkyl)amine.

6. The process of claim 4, wherein the tertiary amine is triethylamine.

7. The process of claim 4, wherein the tertiary amine is tri(hydroxy lower alkyl)amine.

8. The process of claim 4, wherein the tertiary amine is triethanolamine.

References Cited

UNITED STATES PATENTS 2,786,781   3/1957   Vandeputte _____ 167—65

SAM ROSEN, *Primary Examiner.*

UNITED STATES PATENT OFFICE
CERTIFICATE OF CORRECTION

Patent No. 3,332,844                          July 25, 1967

John Vandeputte et al.

It is hereby certified that error appears in the above numbered patent requiring correction and that the said Letters Patent should read as corrected below.

Column 2, line 11, for "said" read -- acid --; line 28, for "5° C." read -- 55° C. --; line 58, for "triethylamnie" read -- triethylamine --; column 3, line 4, for "produce" read -- product --; column 4, line 5, for "slurred" read -- slurried --.

Signed and sealed this 18th day of June 1968.

(SEAL)
Attest:

Edward M. Fletcher, Jr.                        EDWARD J. BRENNER

Attesting Officer                              Commissioner of Patents